US008000504B2

(12) United States Patent
Fan et al.

(10) Patent No.: US 8,000,504 B2
(45) Date of Patent: Aug. 16, 2011

(54) MULTIMODAL CLASSIFICATION OF ADULT CONTENT

(75) Inventors: Xiadong Fan, Bellevue, WA (US); Richard Qian, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1017 days.

(21) Appl. No.: 11/833,775

(22) Filed: Aug. 3, 2007

(65) Prior Publication Data
US 2009/0034851 A1    Feb. 5, 2009

(51) Int. Cl.
G06K 9/62  (2006.01)
G06K 9/72  (2006.01)
G06F 7/00  (2006.01)

(52) U.S. Cl. ......... 382/115; 382/224; 382/229; 707/754

(58) Field of Classification Search ............ 382/115, 382/224, 229, 181, 230; 725/28, 25; 707/959, 707/953, 99.01, 999.01, 999.104, 999.1, 707/999.001, 999.009, 754; 709/203, 201; 380/211, 200, 210; 715/723, 700, 716; 348/473, 348/469
See application file for complete search history.

(56) References Cited

U.S. PATENT DOCUMENTS

| | | | | |
|---|---|---|---|---|
| 6,751,348 B2* | 6/2004 | Buzuloiu et al. | | 382/165 |
| 6,983,273 B2 | 1/2006 | Banerjee | | |
| 7,181,438 B1 | 2/2007 | Szabo | | |
| 7,383,282 B2* | 6/2008 | Whitehead et al. | | 707/700 |
| 7,522,769 B2* | 4/2009 | Harville et al. | | 382/167 |
| 2002/0059221 A1 | 5/2002 | Whitehead | | |
| 2003/0182420 A1 | 9/2003 | Jones | | |
| 2005/0120042 A1* | 6/2005 | Shuster et al. | | 707/102 |
| 2006/0004716 A1 | 1/2006 | Hurst-Hiller | | |
| 2006/0184577 A1 | 8/2006 | Kurapati | | |
| 2007/0011739 A1 | 1/2007 | Zamir | | |
| 2007/0088678 A1 | 4/2007 | Farago | | |
| 2007/0132847 A1 | 6/2007 | Kim | | |
| 2007/0260603 A1* | 11/2007 | Tuscano et al. | | 707/9 |

OTHER PUBLICATIONS

Kim, Youngsoo, "An Efficient Text Filter for Adult Web Documents", Advanced Communication Technology, 2006. ICACT 2006. The 8th International Conference, Feb. 20, 2006.
Hammami, Mohamed, "Adult Content Web Filtering and Face Detection Using Data-Mining Based Skin-Color Model", Multimedia and Expo, 2004. ICME '04, Jun. 27-30, 2004.
Bango Adult Content Policies—Version 1.9, Copyright 2006 Bango. net Ltd., http://bango.com/assets/data/support/adult_policy_whitepaper.pdf.

* cited by examiner

*Primary Examiner* — Sheela Chawan
(74) *Attorney, Agent, or Firm* — Shook Hardy & Bacon, LLP (57) ABSTRACT

Systems and methods for classifying content as adult content and, if desired, blocking content so classified from presentation to a user are provided. Received content is analyzed using a sequential series of classification techniques, each successive technique being implemented only if the previous technique did not result in classification of the content as adult content. In this way, adult content may be identified across a variety of different media types (e.g., text, images, video, etc.) and yet processing power may be reserved if one or more techniques requiring less power is sufficient to determine that the received content is, in fact, adult content. Content classification may be performed in-band (that is, in substantially real-time such that content may be identified and/or blocked at the time results of a user query are returned) or out-of-band (that is, prospectively as new content is received but not in association with a user query).

18 Claims, 5 Drawing Sheets

MULTIMODAL CLASSIFICATION OF ADULT CONTENT

BACKGROUND

Through the Internet and other networks, users are able to gain access to large amounts of distributed information. In order to access particular portions of the vast amount of information available, users typically access a search engine that responds to an input query by returning one or more relevant sources of available information. The sources of information and/or the information itself accessed by a search engine are generally classified, e.g., by the subject matter they contain, providing the search engine with the ability to filter sources and/or information based on their classification. Classification of content as adult content is one frequently utilized classification for filtering. Identifying content as adult content, however, is challenging due to the adaptability and evolution of adult content available. Additionally, identification of content as adult content is further complicated due to the different media types (e.g., text, images, video, etc.) with which such content may be affiliated.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present invention relate to systems and methods for classifying content as adult content and, if desired, blocking content so classified from presentation to a user. Received content is analyzed using a sequential series of classification techniques, each successive technique being implemented only if the previous technique did not result in classification of the content as adult content. In this way, adult content may be identified across a variety of different media types (e.g., text, images, video, etc.) and yet processing power may be reserved if one or more techniques requiring less power is sufficient to determine that the received content is, in fact, adult content. Content classification may be performed in-band (that is, in substantially real-time such that content may be identified and/or blocked at the time results of a user query are returned) or out-of-band (that is, prospectively as new content is received but not in association with a user query).

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to systems and methods for classifying content as adult content and, if desired, blocking content so classified from presentation to a user. Received content is analyzed using a sequential series of classification techniques, each successive technique being implemented only if the previous technique did not result in classification of the content as adult content. In this way, adult content may be identified across a variety of different media types (e.g., text, images, video, etc.) and yet processing power may be reserved if one or more techniques requiring less power is sufficient to determine that the received content is, in fact, adult content. Content classification may be performed in-band (that is, in substantially real-time such that content may be identified and/or blocked at the time results of a user query are returned) or out-of-band (that is, prospectively as new content is received but not in association with a user query).

Accordingly, in one aspect, the present invention provides one or more computer storage media having computer-executable instructions embodied thereon for performing a method for classifying adult content. The method includes receiving content having a Uniform Resource Locator (URL), webpage text, and at least one image associated therewith; analyzing one or more of the URL, the webpage text, and the image to determine a likelihood that the received content is adult content; and classifying the received content as adult or not adult based upon the determined likelihood. The webpage text is analyzed only if the URL is not indicative of adult content and the image is analyzed only if the webpage text is not indicative of adult content.

In another aspect, the present invention provides a method for classifying adult content. The method includes receiving content having at least one image associated therewith; analyzing the image to determine if it includes one or more face regions; analyzing the image to determine if it includes one or more regions of predominantly skin-colored pixels; analyzing the image to determine if it includes one or more highly textured regions; determining a likelihood that the image is an adult image based upon whether the image includes one or more face regions, one or more regions of predominantly skin-colored pixels, and one or more highly textured regions; and classifying the received content as adult or not adult based upon the determined likelihood with respect to the at least one image. In embodiments, the method further includes analyzing the image to determine if it includes one or more human-body shaped regions and determining the likelihood that the image is an adult image based, in part, on whether the image includes any human-body shaped regions.

In yet another aspect, the present invention provides a computer system embodied on one or more computer storage media having computer-executable instructions embodied thereon for performing a method for classifying web pages as containing adult content. The computer system includes a receiving component configured for receiving a web page having a plurality of images associated therewith; an analyzing component configured for analyzing each of the plurality of images to determine a likelihood that the analyzed image is an adult image; a comparing component configured for comparing the determined likelihood with respect to each analyzed image to a threshold; and a classifying component configured for classifying the received web page as adult or not adult based upon at least one of a number and a frequency of determined likelihoods which exceed the threshold. In one embodiment, if the received web page is classified as adult, a URL associated with the web page is included on a list of known adult URLs.

Having briefly described an overview of embodiments of the present invention, an exemplary operating environment suitable for use in implementing embodiments of the present invention is described below.

Figure 1:
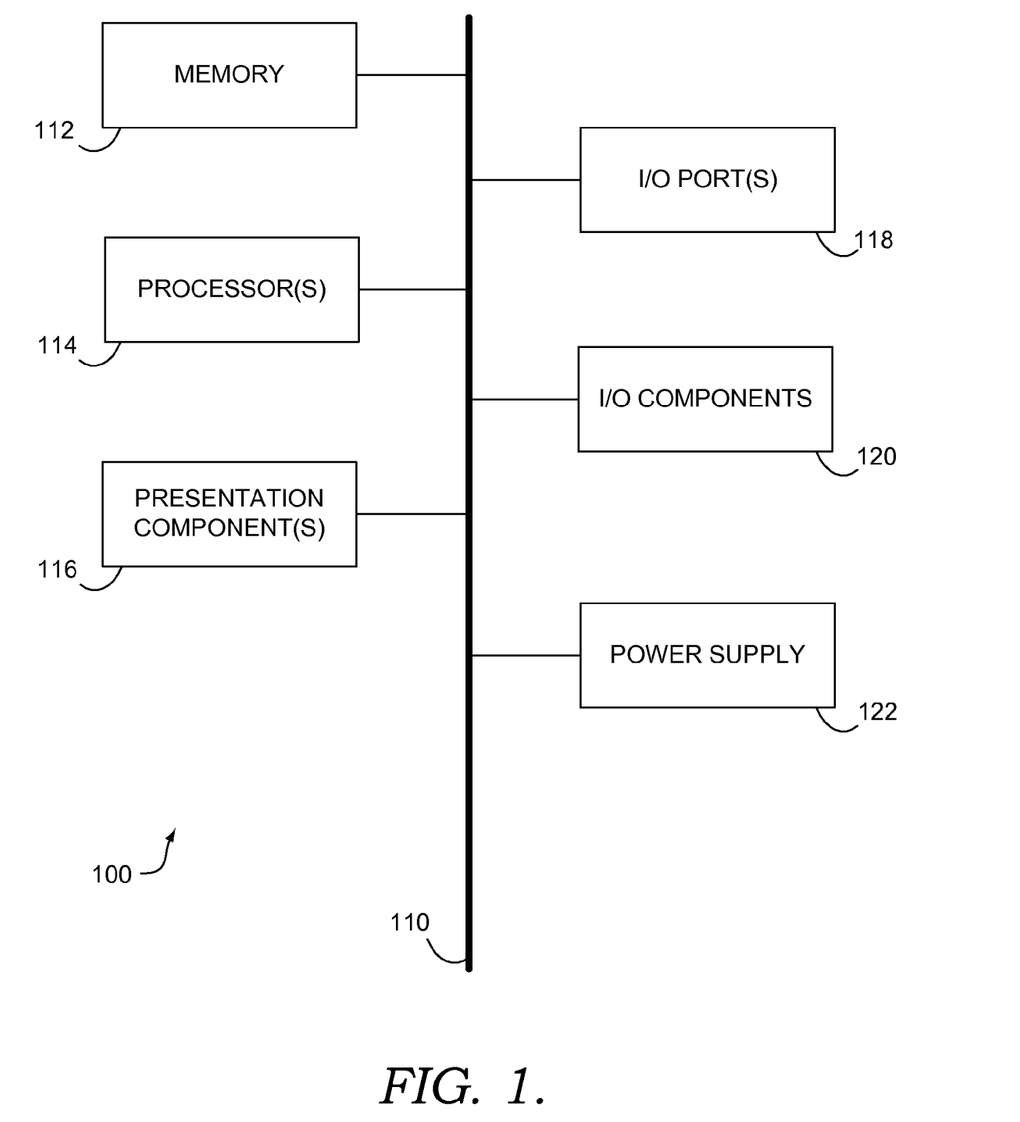
FIG. 1 is a block diagram of a computing system environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the illustrated computing environment be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the present invention may be practiced in a variety of system configurations, including hand-held devices, consumer electronics, general-purpose computers, specialty computing devices, and the like. Embodiments of the present invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, and the like. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game advertisement, satellite dish, scanner, printer, wireless device, and the like.

Figure 2:
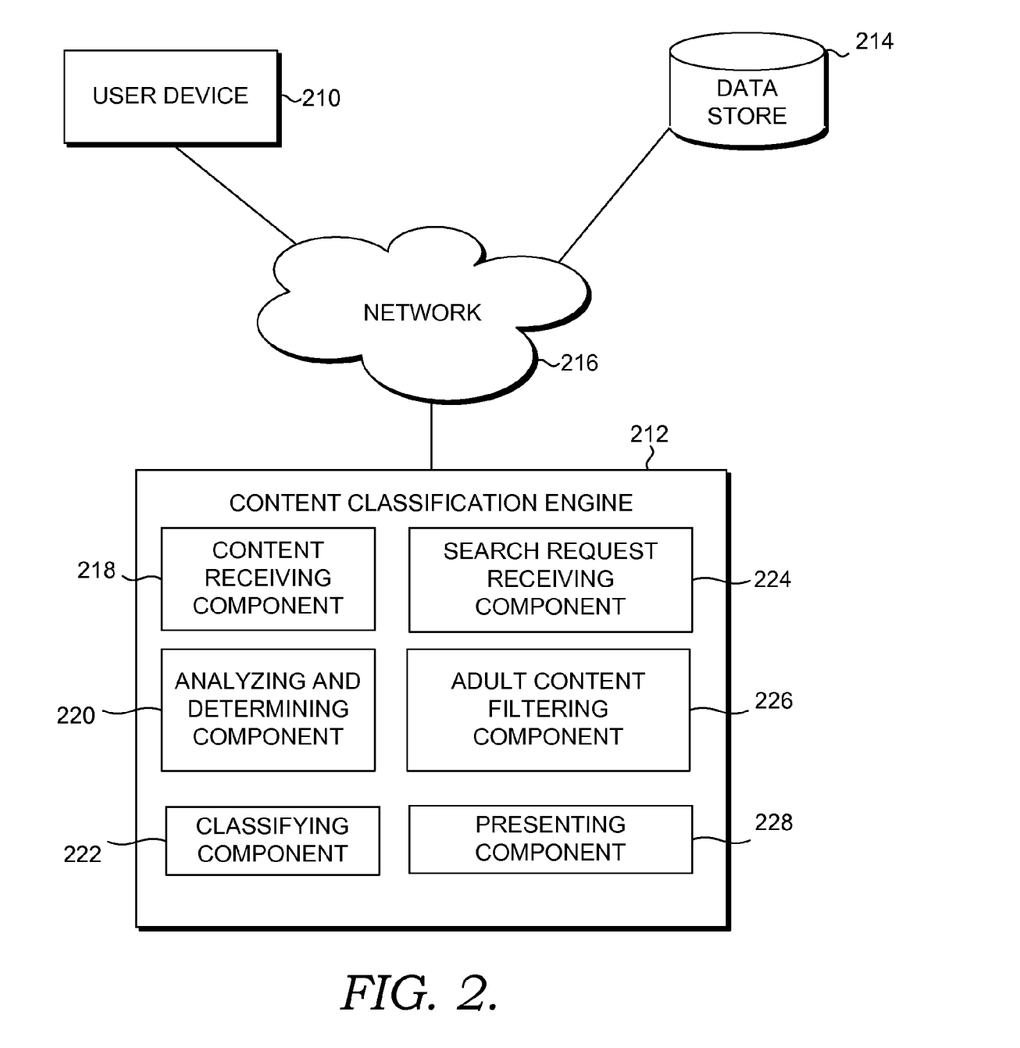
FIG. 2 is a block diagram illustrating an overview of a system in accordance with an embodiment of the invention.

Turning now to FIG. 2, a block diagram is illustrated that shows an exemplary computing system 200 configured to classify content as adult or not adult based upon at least one classification technique, in accordance with an embodiment of the present invention. It will be understood and appreciated by those of ordinary skill in the art that the computing system 200 shown in FIG. 2 is merely an example of one suitable computing environment and is not intended to suggest any limitation as to the scope of use or functionality of the present invention. Neither should the computing system 200 be interpreted as having any dependency or requirement related to any single component/module or combination of components/modules illustrated therein.

Computing system 200 includes a content classification engine 210, a user device 212, and a data store 214 all in communication with one another via a network 216. The network 216 may include, without limitation, one or more local area networks (LANs) and/or wide area networks (WANs). Such networking environments are commonplace in offices, enterprise-wide computer networks, intranets, and the Internet. Accordingly, the network 216 is not further described herein.

The data store 214 may be configured to store information associated with various types of content, as more fully described below. In various embodiments, such information may include, one or more text blobs, one or more images, one or more videos, a textual description associated with one or more images or videos, text surrounding one or more images or videos, anchor and/or ALT text associated with one or more images or videos, as well as text, image, video, and/or URL classifications associated with received content. In addition, the data store 214 may include zero receive content or associated information stored in association therewith but rather may contain an organizational blueprint with an empty set. In some embodiments, the data store 214 is configured to be searchable for one or more items of information stored in association therewith.

It will be understood and appreciated by those of ordinary skill in the art that the information stored in the data store 214 may be configurable and may include any information relevant to online content. Further, though illustrated as a single, independent component, data store 214 may, in fact, be a plurality of data stores, for instance, a database cluster, portions of which may reside on a computing device associated with the content classification engine 212, the user device 210, another external computing device (not shown), and/or any combination thereof.

Each of the content classification engine 212 and the user device 210 shown in FIG. 2 may be any type of computing device, such as, for example, computing device 100 described above with reference to FIG. 1. By way of example only and not limitation, the content classification engine 212 and/or the user device 210 may be a personal computer, desktop computer, laptop computer, handheld device, mobile handset, consumer electronic device, and the like. It should be noted, however, that the present invention is not limited to implementation on such computing devices, but may be implemented on any of a variety of different types of computing devices within the scope of embodiments hereof.

As shown in FIG. 2, the content classification engine 212 includes a content receiving component 218, an analyzing and determining component 220, a classifying component 222, a search request receiving component 224, an adult content filtering component 226 and a presenting component 228. In some embodiments, one or more of the illustrated components 218, 220, 222, 222, 224, 226 and 228 may be implemented as stand-alone applications. In other embodiments, one or more of the illustrated components 218, 220, 222, 222, 224, 226 and 228 may be integrated directly into the operating system of the content classification engine 212 or the user device 210. In the instance of multiple servers, embodiments of the present invention contemplate providing a load balancer to federate incoming queries to the servers. It will be understood by those of ordinary skill in the art that the components 218, 220, 222, 224, 226 and 228 illustrated in FIG. 2 are exemplary in nature and in number and should not be construed as limiting. Any number of components may be employed to achieve the desired functionality within the scope of embodiments of the present invention.

The content receiving component 218 is configured for receiving content. Content received via the content receiving component 218 may include a variety of different media types including, but not limited to, text, images, and video content. In one embodiment, content received via the content receiving component 218 includes at least one of a Uniform Resource Locator (URL), webpage text, an image (which may include one or more video frames), a video, a textual description of an image or video, and text surrounding an image or video (including anchor text and/or ALT text). Once received by the content receiving component 218, the content may be stored, for instance, in association with data store 214, such that it is searchable to determine satisfaction of a user query, as more fully described below. Such received content may additionally be indexed, if desired.

The analyzing and determining component 220 is configured for analyzing the received content to determine a likelihood that the received content is adult content. In one embodiment, the analyzing and determining component includes a plurality of components configured for sequentially analyzing portions of the received content only if a likelihood that the received content is adult content fails to exceed a particular threshold when analyzed by a sequentially previous component. One such embodiment is described more fully below with reference to FIGS. 3 and 4.

The classifying component 222 is configured for classifying the received content as adult or not adult based upon the determined likelihood. Typically, the likelihood determined utilizing the analyzing and determining component 220 is compared to a classification hierarchy and, if desired, user computing device settings, to classify the received content as adult or not adult in accordance therewith.

The search request receiving component 224 is configured for receiving a search request for which satisfying content is desired. By way of example, the search request may be received at a user interface as the result of user input. It will be understood and appreciated by those of ordinary skill in the art that multiple methods exist by which a user may input a search request. For instance, search requests may be input, by way of example only, utilizing a keyboard, joystick, trackball, touch-advertisement, or the like. Alternative user interfaces known in the software industry are contemplated by the invention. The search request is typically a user-initiated action or response that is received at a user interface, as discussed above. Examples of a request are a click, click-through, or selection by a user, e.g., human user or robotic user; however, it is understood and appreciated by one of ordinary skill in the art that a request may take any number of forms of indication at a web page. Further, it is contemplated by the present invention that a robotic user may be any non-human operator (i.e., an internet bot, web bot program, virus, robot, web crawler, web spidering program, or any software applications that run automated tasks over the Internet), which is an artificial agent that, by its actions, conveys a sense that it has intent or agency of its own. Even further, a human user is contemplated as being a human, but also, an entity (virtual or physical) acting under the present intent of a human operator.

The adult content filtering component 226 is configured for filtering content classified as adult content such that such content is not presented as satisfying a received search request. Various levels of filtering may be applied depending on one or more settings specified by a user. That is, one user may not want to be presented with content classified as adult based upon a lenient scale and another user may not want to be presented with content classified as adult content based upon a rather stringent scale. Methods for permitting users to define settings associated with a computing device are known to those of ordinary skill in the art and, accordingly, are not further described herein.

The presenting component 228 is configured for presenting at least one of search results, filtered search results, and information relating to content classification to a user. Typically such presentation will be by way of display in association with a user interface. However, other forms of presentation, including audio presentation and audio/video presentation, are contemplated to be within the scope of embodiments hereof.

Figure 3:
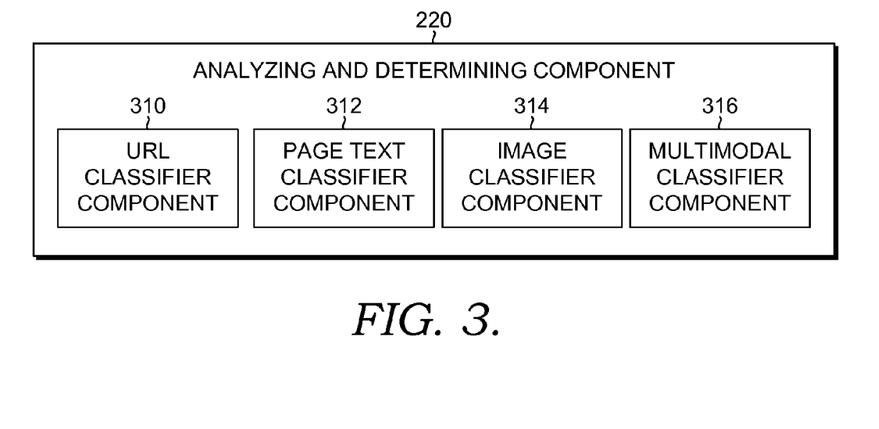
FIG. 3 is a block diagram illustrating an adult content filter component, in accordance with an embodiment of the invention.

Turning now to FIG. 3, one embodiment of the analyzing and determining component 220 is described in further detail. As illustrated, the analyzing and determining component 220 includes a URL classifier component 310, a page text classifier component 312, an image classifier component 314, and a multimodal classifier component 316. It will be understood by those of ordinary skill in the art that the components 310, 312, 314, and 316 illustrated in FIG. 3 are exemplary in nature and in number and should not be construed as limiting. Any number of components may be employed to achieve the desired functionality within the scope of embodiments hereof.

Each classifier component 310, 312, 314, and 316 sequentially determines a likelihood that the received content is adult content based upon a particular methodology, as more fully described below. If one classifier component determines that the received content is to be classified as adult content, the input content is thereby classified as adult content, and the remaining classifier components in the sequence are not employed. Such determination occurs when the likelihood that the received content comprises adult content reaches a pre-determined threshold, for instance, based upon number and/or frequency of suspicious constituents contained therein. If the input content has not been determined to be adult content after implementation of the URL classifier component 310, the page text classifier component 312, and the image classifier component 314, the multimodal classifier component 316 analyzes the individual determinations collectively to render a final determination of whether the received content is adult content.

It will be appreciated that the classifier components 310, 312, 314, and 316 are ordered such that the first classifier component in the sequence (the URL classifier component 310) requires the least amount of processing. That is, the URL classifier component 310 performs the simplest analysis, and one skilled in the art will appreciate that if received content can be determined to be adult content at this early stage of processing, processing capacity and time may be conserved. Thus, the more difficult the adult content is to detect/identify, the more classifier components may be utilized to make an adult content determination.

The URL classifier component 310 is configured to examine at least one URL associated with received content to determine a first likelihood that the received content is adult content. A URL (Uniform Resource Locator) address serves as an identifier of web pages on a network, and exists as a URL string with a site name, a path name, and a file name. The URL can be obtained either by the user typing the address directly into the address bar of a web browser or the URL address can be retrieved by the user inputting a query into a search engine and selecting a webpage link from the resulting list, as more fully described below with respect to search request receiving component 224 of FIG. 2.

In one embodiment, the URL classifier component 310 analyzes the URL string using a two step process. First, the URL classifier component 310 breaks the URL string down into an array of words forming a word array. Subsequently, the URL classifier component 310 analyzes the text of the word array to determine whether the text contains adult content. Without this first step, the URL string would have to be analyzed in string form which is both time-consuming and likely to result in a higher percentage of false positives.

Once the string is broken down into a word array, the words may be stemmed using a stemmer and normalized using an equivalence classifier to improve the coverage of the classifier. A stemmer performs stemming on the array of words, which reduces the words to their stem or root form. For example, the stem of the words "searching" and "searcher" would be "search." Additionally, one skilled in the art would appreciate that an equivalence classifier may be used to normalize words with equivalent semantic meaning. For example, the terms "picture," "graph," "wallpaper," and "photograph" could all be normalized to the term "picture."

After the URL string has been translated into a word array and the word array has been stemmed and normalized to give a list of terms, these terms are analyzed to identify adult content. Specifically, a set of unigrams and bi-grams may be used to make this determination. A unigram is a word which by itself has a clear adult connotation. For example, the word both words are non-adult words, but when combined, may have an adult connotation. For example, the term "adult" by itself would not be a unigram. However, when combined with other terms, a bi-gram may be created. For instance, the phrase "adult movie" is an adult bi-gram, but the phrase "adult education" is not.

A machine learning algorithm may be used to automatically select a set of unigram and bi-gram terms from a training set of adult/non-adult URLs. This set of unigram and bi-gram terms may be stored, for instance, in association with data store 214 of FIG. 2, and may be continually updated as appropriate. It will be appreciated that the specific unigrams and/or bi-grams used to compare to the URL text may be adjusted based upon the level of filtering desired.

If desired, individual unigrams and bi-grams may carry a weight which represents its "detrimental" degree. The likelihood that the URL from the input content comprises adult content may accordingly be calculated by adding up the weights of all detected unigram and bi-gram features. If this likelihood reaches a certain threshold, it will be determined that the received content includes adult content and, if desired, the received content will be filtered and not presented to the user.

The page text classifier component 312 is configured to analyze the webpage text of the received content to determine a second likelihood that the received content is adult content. It will be appreciated that the page text classifier component 312 requires more processing power than the URL classifier component 310.

The page text classifier component 312 may analyze multiple sources of text from the received content. Exemplary sources of text include webpage text, text surrounding an image or video that provides a textual description of the image or video, anchor text, ALT text, and the like. If the received content contains webpage text, the page text classifier first analyzes the webpage text, which is the standard text included on a webpage. Within the page text classifier component 312, a text classifier is then used to detect adult words in the webpage text. It will be appreciated that a stemmer and an equivalence classifier may be used to stem and normalize the webpage text in order to improve the detection rate of adult words in the webpage text.

One skilled in the art will appreciate that this text classifier component 312 may be the same as the text classifier used above with respect to the URL classifier, or it may be a different classifier. Nevertheless, the page text classifier component 312 is trained differently than the one used for URL terms because it uses adult/non-adult articles crawled from the Internet or other network. Therefore, a separate set of unigram and bi-gram terms is stored, for instance, in association with data store 214 of FIG. 2, for the page text classifier component 312. Additionally, the unigram and bi-gram terms used by the page text classifier component 312 may be given different weights for each term used in order to determine the likelihood of adult content.

The page text classifier component 312 may also analyze anchor text and ALT text. Anchor text, or link text, is the text on a webpage that the user clicks when selecting a link on the webpage that will redirect the user to another page on the same site or to a page on an external site. Typically, when a URL address is embedded in the text of a webpage as anchor text, the link is related to what is being discussed in the text. ALT text, or alternate text, is the text description that can be added to the HTML tag displaying an image. The ALT text is displayed by the browser when the cursor is moved over the image. If, for example, the image is turned off or unviewable, the ALT text is automatically displayed instead. Similar to the analysis of the webpage text described above, the text information from these sources is collected, and may be stemmed and normalized. Then, a text classifier, trained from the textual description of a set of adult/non-adult internet images, is applied.

After analyzing the various sources of text, the page text classifier component 312 calculates the likelihood of the input content containing adult content. If the likelihood reaches a pre-determined threshold, the page text classifier identifies the input content as adult content, if desired, such content may be filtered from presentation to a user.

Figure 4:
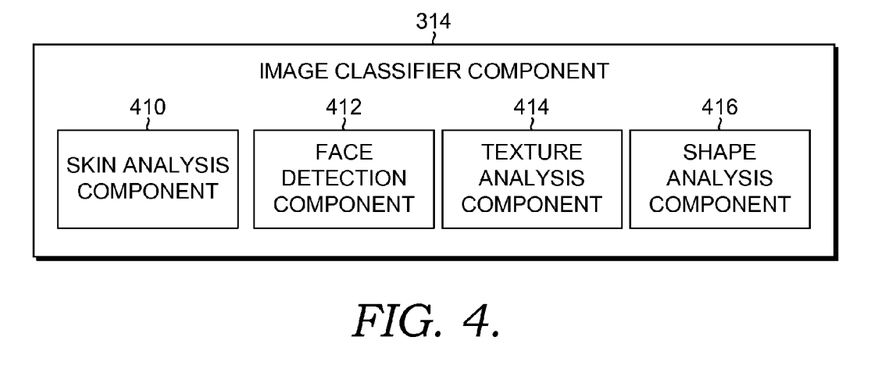
FIG. 4 is a block diagram illustrating an image classifier component in accordance with an embodiment of the invention.

The image classifier component 314 is configured to analyze an image or video frame to determine a third likelihood that the received content is adult content. It will be appreciated that the image classifier component 314 requires more processing power than the previous classifiers 310 and 312. With reference to FIG. 4, a block diagram illustrating an embodiment of the image classifier component 314 is shown. The illustrated image classifier component 314 includes a skin analysis component 410, a face detection component 412, a texture analysis component 414, and a shape analysis component 416. It will be understood by those of ordinary skill in the art that the components 410, 412, 414, and 416 illustrated in FIG. 4 are exemplary in nature and in number and should not be construed as limiting. Any number of components may be employed to achieve the desired functionality within the scope of embodiments of the present invention.

The skin analysis component 410 is configured to analyze an image or video frame to determine whether the image/video frame contains skin regions, that is, regions containing predominantly skin-colored pixels. Skin-colored pixels can be identified by, for example, matching pixel color to colors that are pre-determined to correlate to skin. Regions that contain a specific number (or relative frequency) of skin pixels are initially identified as skin regions. If no skin pixels are detected, the image or video frame may be determined to not include adult images. It will be appreciated that the color of pixels indicative of skin may be altered and adjusted as necessary.

The face detection component 412 is configured to determine whether the image or video frame contains a face, particularly within the skin regions identified by the skin analysis component 410. That is, for each skin region identified by the skin analysis component 410, the face detection component 412 analyzes the skin region in order to detect a face. If a face is present in the image or video frame, the face detector will detect the frontal faces in the image, and output the bounding boxes of any detected faces. This step serves as a check on the skin analysis component 410 and alleviates the incidence of false positives in the image classification process. One skilled in the art will appreciate that a face in an image (e.g., a mug shot) contains many skin-colored pixels and warrants further analysis since an image consisting of primarily a face would not comprise adult content. Thus, the pixels in the face area of the skin regions are removed from the skin region in making a determination with respect to adult content, as more fully described below. Additionally, the skin analysis component 410 may store the color of the face pixels and recalibrate its skin color model using this information.

The texture analysis component 414 is configured to analyze the texture of the image or video frame and uses the texture analysis to determine whether the skin regions identified by the skin analysis component 410 are, in fact, skin. Thus, the texture analysis component 414 examines the texture of each skin region. This step is useful to avoid classifying regions that do not actually comprise skin (e.g., hair, fur, etc.), even though the pixels might be the same color as skin. It will be appreciated that the texture of skin regions typically will be smooth. The texture analysis component 414 begins by analyzing the edge and corners of the image. Continuing this analysis across the image, the texture of the image is measured. Additionally, the texture of the skin regions detected by the skin analysis component 410 is analyzed and computed. Any areas that are not smooth are defined as textured regions, and as above with the face detection component 412, those regions determined to be textured are removed from the skin regions in making a determination with respect to adult content, as more fully described below.

The shape analysis component 416 is configured to analyze the skin regions identified by the skin analysis component 410 to determine whether these skin regions are in the shape that can be identified as an adult content shape (e.g., a human-body shape). The shape analysis component 516 examines the shapes of the skin regions, and defines the shape of each skin region based on predetermined shapes associated with adult content. If the shape of a skin region is defined as adult (e.g., has a human-body shape), the image is classified as adult content. If not, the image is classified as not an adult image.

Returning to FIG. 3, the multimodal classifier component 320 is configured to make an adult content determination based on input from the URL classifier component 310, the page text classifier component 312, the image classifier component 314, and the image classifier component 316 in the event that any of such components alone fails to make such determination.

Figure 5:
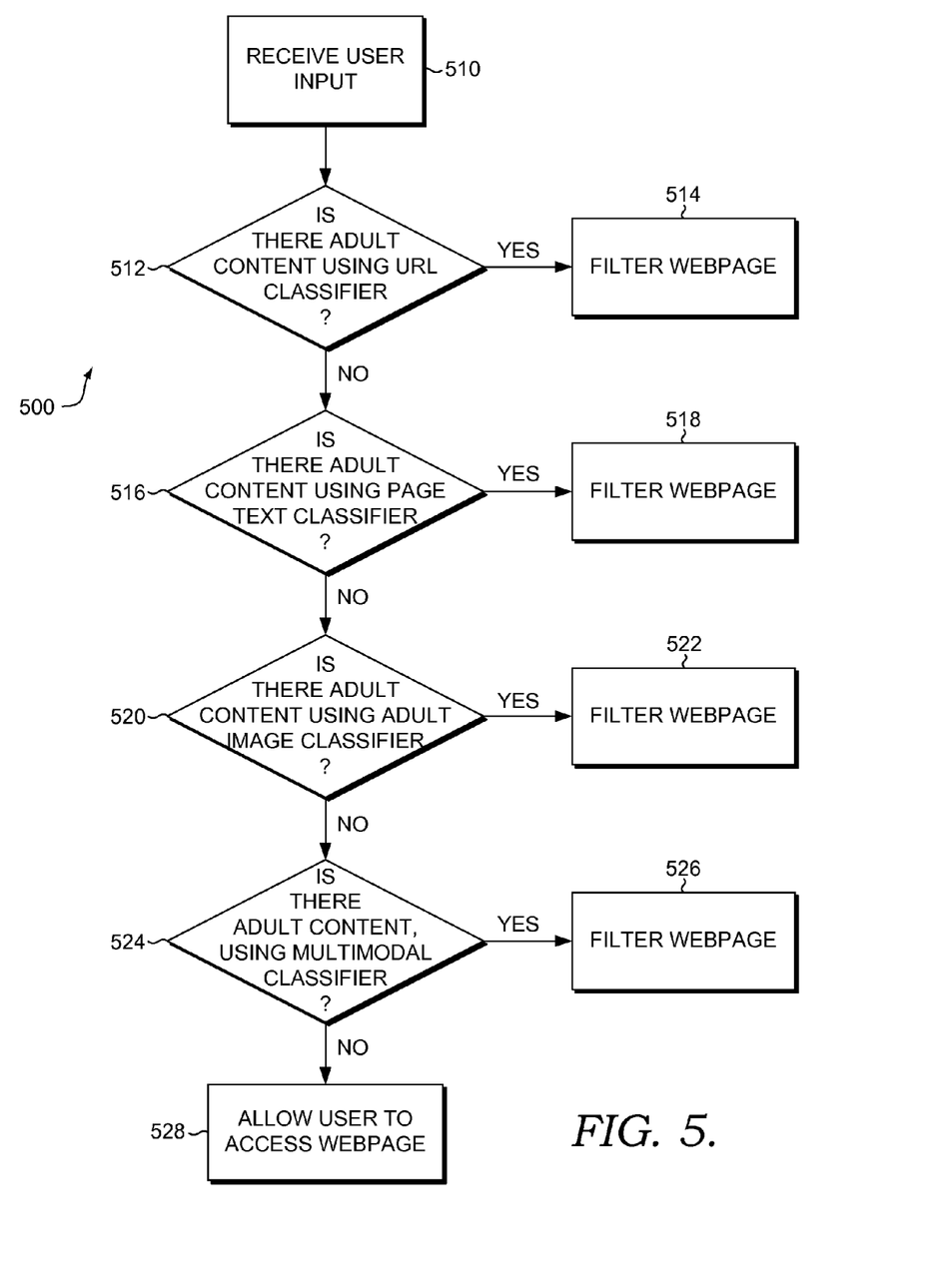
FIG. 5 is a flow diagram illustrating a method for classifying and/or filtering adult content, in accordance with an embodiment of the invention.

Turning now to FIG. 5, an exemplary method 500 for identifying, classifying and filtering adult content is illustrated. Initially, as indicated at block 510, content (e.g., textual content, image content, video content, and the like) is received, for instance, by content receiving component 218 of FIG. 2. Subsequently, it is determined (for instance, utilizing URL classifier component 310 of FIG. 3) whether at least one URL associated with the received content contains constituents (e.g., words, unigrams, bi-grams and the like) indicative of adult content. This is indicated at block 512. If it is determined that the URL contains constituents indicative of adult content, the received content is classified as adult content and filtered, as indicated at block 514.

If it is determined at block 512 that the URL does not contain constituents indicative of adult content, webpage text associated with the received content is analyzed (for instance, utilizing page text classifier component 312 of FIG. 3) to determine whether the webpage text contains constituents indicative of adult content. This is indicated at block 516. After analyzing the various sources of text (described herein above with reference to FIG. 3), a likelihood that the received content contains adult content is calculated. If the likelihood reaches a predetermined threshold, the received content is classified as adult content and filtered, as indicated at block 518.

If it is determined at block 516 that the webpage text associated with the received content does not contain constituents indicative of adult content, any images associated with the received content are analyzed (e.g., utilizing image classifier component 314 of FIG. 3) to determine whether the images contain constituents indicative of adult images. This is indicated at block 520. Image classification is more fully described below with respect to FIG. 6.

If it is determined at block 520 that the image(s) associated with the received content contain constituents indicative of adult images, the images and/or the received content is filtered, as indicated at block 522. If, however, it is determined at block 520 that the images are not indicative of adult images, the determinations of all classification steps (e.g., determinations made at blocks 512, 516, and 520), as well as any scoring and/or weighting associated therewith, are analyzed collectively, as indicated at block 524.

As discussed above, each classifier component (e.g., components 310, 312 and 314 of FIG. 3) computes the likelihood of the received content being adult content, and compares the likelihood against its own predetermined threshold. However, if none of the likelihoods is high enough to result in filtering of the received content, a multimodal classifier (e.g., multimodal classifier component 316 of FIG. 3) is applied to make a final determination. The multimodal classifier uses input from all previous classifier components to collectively determine whether the received content is adult content. If the multimodal classifier determines that the received content is adult content, it will be classified as such and filtered, as indicated at block 526. If not, the process terminates and the received content is presented to a user, as indicated at block 528.

Figure 6:
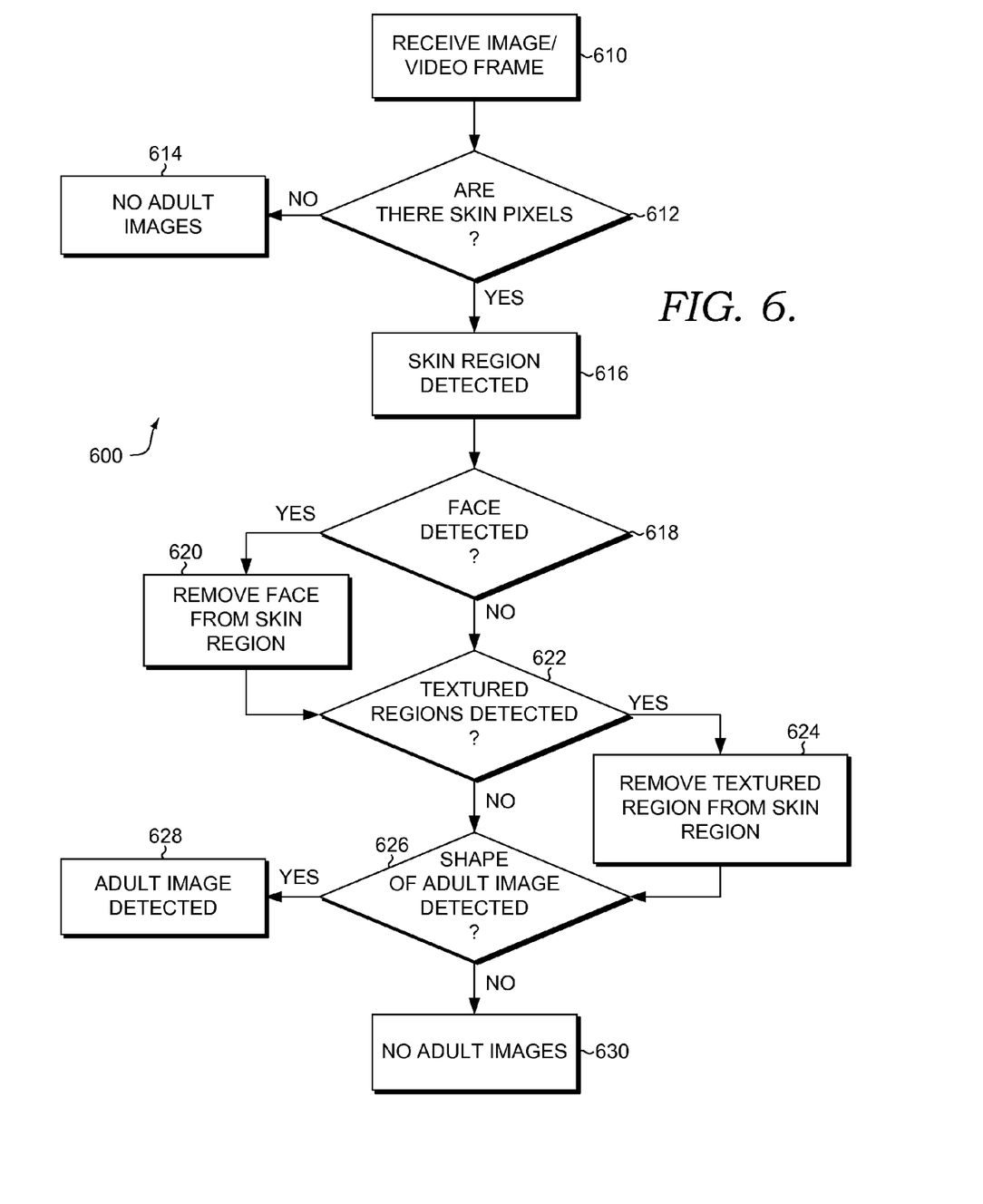
FIG. 6 is a flow diagram illustrating a method for detecting adult images and/or video, in accordance with an embodiment of the invention.

Turning now to FIG. 6, an exemplary method 600 for classifying images, e.g., utilizing image classifier component 314 of FIG. 3, is illustrated. Specifically, as described above, an image classifier examines whether an image or video frame contains adult content. In one embodiment, the image classifier analyzes images and video frames using four components: a skin analyzer, a face detector, a texture analyzer, and a shape analyzer. One skilled in the art will appreciate that these components can be used separately, in some combination together, or in combination with other components, to analyze an image or video frame. An exemplary method of identifying adult content using the adult image classifier utilizes all of the components together for a more accurate analysis. In the last step, the image classifier uses information obtained from these components to compute a final likelihood that the received image or video frame contains adult content. If the likelihood is higher than a predetermined threshold, the received content will be determined to contain adult content and, if desired, the received content will be filtered.

The adult image classifier works by identifying adult images in the image or video frame of the input content. At initially indicated at block 610, an image or video frame from the received content is received. Once this image is received, a skin analyzer (e.g., skin analysis component 410 of FIG. 4) examines the image or video frame to detect skin pixels. This is indicated at block 612. As previously described, skin pixels can be identified by, for example, matching pixel color to colors that are determined to correlate to skin. Regions that contain a specific number of skin pixels are initially identified as skin regions. This is indicated at block 616. If no skin pixels are detected, the image or video frame is determined to not contain any adult images, as indicated at block 614. It will be appreciated that the color of pixels indicative of skin may be altered and adjusted as necessary.

For each skin region identified by the skin analyzer, a face detector (e.g., face detection component 412 of FIG. 4) analyzes the skin region in order to detect the presence of a face. This is indicated at block 618. If a face is detected as present in the image or video frame, the face detector will detect the frontal faces in the image and output the bounding boxes of any detected faces. One skilled in the art will appreciate that a face in an image contains many skin pixels and deserves further analysis since an image consisting of primarily a face would not comprise adult content. Thus, the pixels in the face area of the skin regions are removed from the skin region, as indicated at block 620. Additionally, the skin analyzer may store the color of the face pixels and recalibrate its skin color model using this information.

Next, as indicated at block 622, a texture analyzer (e.g., texture analysis component 414 of FIG. 4) examines the texture of each skin region. This step is useful to avoid classifying regions that do not actually comprise skin (e.g., hair, fur, etc.), even though the pixels might be the same color as skin. Any areas that are determined to be highly textured are removed from the skin regions, as indicated at block 624.

Once skin regions have been identified in the image or video frame, a shape analyzer (e.g., shape analysis component 416 of FIG. 4) analyzes the skin regions, as indicated at block 626. The shape analyzer examines the shapes of the skin regions, and defines the shape of each skin region based on predetermined shapes associated with adult content. If the shape of a skin region is defined as adult, an adult image is detected, as indicated at block 628. If not, the skin region is determined not to be an adult image, as indicated at block 630.

The image classifier (e.g., image classifier component 314 of FIG. 3) then combines the information provided by the four components to calculate the likelihood of the image or video frame containing adult content. If this likelihood reaches a certain predetermined threshold, the image or video frame will be classified as adult content.

Further embodiments of the present invention relate to systems and methods for using an adult content classifier in a search engine. More specifically, an adult content classifier may be used for both in-band and out-of-band blocking in an image or video search engine. Using an adult content classifier in this way increases the adult content detection rate, yet provides a reasonably low false positive rate.

In-band blocking refers to applying the adult content classifier directly in the index generation and serving pipeline, so that the adult content will be automatically blocked for users who choose to have adult filtering protection. By way of example, and not limitation, based on the likelihood of adult content, the search engine results may be blocked using either a moderate or strict adult filtering mode. For example, in the moderate mode, the results with adult content likelihood above a high threshold are blocked, and, when in a strict mode, a lower threshold is used so that the adult content is filtered more aggressively. One skilled in the art will appreciate that there may be more than two modes of filtering and that the modes and the thresholds of each mode may be modified when desired.

Out-of-band blocking refers to using an adult content classifier offline. It will be appreciated that this increases the detection rate of adult content and decreases the false positive rate by either involving human verification or by combining classification results from individual documents, such as pages, images, videos and the like.

The process of out-of-band blocking may involve two components: an out-of-band advisor and an out-of-band adult site/page detector. It will be appreciated that these components may be used either in combination or separately within a search engine. For an out-of-band advisor component, the adult content classifier is applied to detect the suspicious adult content with a low threshold. This may for instance be content that has some likelihood of being adult content but not a high enough likelihood to fall under the thresholds used for the in-band blocking system, as discussed above. A human judge then verifies the classification of the input content to determine whether in fact it should be classified as adult content. If, based on human verification, the input content is deemed to be adult, the content's URL is sent to a blocking list integrated into the crawler, and the input content will be identified in the future as adult content when using the in-band blocker.

For an out-of-band adult site/page detector, an adult content classifier analyzes a page containing several images or videos. One skilled in the art will appreciate that some adult images are easier to detect as adult content than others. To detect whether an image or video is adult content, an adult content classifier is applied on each image or video individually. Offline, these results are combined to determine whether the entire page can be classified as adult content. This determination is made if the page contains a significant number of adult images or videos. When a higher level of adult content filtering is desired, an entire page can be blocked if it contains at least one adult image. Additionally, link analysis may be used to increase the adult content detection rate by blocking any page which is linked to an adult page.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. One or more computer storage media having computer-executable instructions embodied thereon for performing a method for classifying adult content, the method comprising:
    receiving content having a Uniform Resource Locator (URL), webpage text, and at least one image associated therewith;
    analyzing one or more of the URL, the webpage text, and the at least one image to determine a likelihood that the received content is adult content, wherein the webpage text is analyzed only if the URL is not indicative of adult content, and wherein the at least one image is analyzed only if the webpage text is not indicative of adult content; and
    classifying the received content as adult or not adult based upon the determined likelihood.

2. The one or more computer storage media of claim 1, wherein the method further comprises:
    receiving a search request;
    determining that the received content satisfies the search request; and
    presenting the received content in response to the search request only if the received content is classified as not adult.

3. The one or more computer storage media of claim 1, wherein analyzing one or more of the URL, the webpage text, and the at least one image to determine a likelihood that the received content is adult content comprises:
    analyzing the URL to determine a first likelihood that the received content is adult content; and
    determining whether the first likelihood exceeds a first threshold,
    wherein if the first likelihood exceeds the first threshold, the determined likelihood and the first likelihood are equivalent,
    and wherein if the first likelihood does not exceed the first threshold, the method further comprises analyzing the webpage text.

4. The one or more computer storage media of claim 3, wherein analyzing the webpage text comprises:
    analyzing the webpage text to determine a second likelihood that the received content is adult content; and
    determining whether the second likelihood exceeds a second threshold,
    wherein if the second likelihood exceeds the second threshold, the determined likelihood and the second likelihood are equivalent,
    and wherein if the second likelihood does not exceed the second threshold, the method further comprises analyzing the at least one image.

5. The one or more computer storage media of claim 4, wherein analyzing the at least one image comprises:
    analyzing the at least one image to determine a third likelihood that the received content is adult content; and
    determining whether a third likelihood exceeds a third threshold,
    wherein if the third likelihood exceeds the third threshold, the determined likelihood and the third likelihood are equivalent,
    and wherein if the third likelihood does not exceed the third threshold, determining the likelihood that the received content is adult content comprises collectively analyzing the first likelihood, the second likelihood, and the third likelihood.

6. The one or more computer storage media of claim 5, wherein analyzing the at least one image comprises:
    analyzing the at least one image to determine if the at least one image includes one or more face regions;
    analyzing the at least one image to determine if the at least one image includes one or more regions of predominantly skin-colored pixels;
    analyzing the at least one image to determine if the at least one image includes one or more highly textured regions; and
    determining the third likelihood based upon whether the at least one image includes one or more face regions, one or more regions of predominantly skin-colored pixels, and one or more highly textured regions.

7. The one or more computer storage media of claim 6, wherein if it is determined that the at least one image includes one or more regions of predominantly skin-colored pixels, the method further comprises analyzing a shape of the one or more regions of predominantly skin-colored pixels to determine if at least one of the one or more regions of predominantly skin-colored pixels has a human-body shape,
    and wherein determining the third likelihood comprises determining the third likelihood based upon whether the at least one image includes one or more face regions, one or more highly textured regions, and one or more human-body shaped regions of predominantly skin-colored pixels.

8. The one or more computer storage media of claim 4, wherein analyzing the webpage text to determine a second likelihood that the received content is adult content comprises:
    breaking the webpage text into one or more words, the webpage text including at least one of webpage content and a textual description of an image and/or video content;
    normalizing the one or more words utilizing at least one of stemming and equivalence classifying;
    comparing the normalized one or more words to a list of known adult words; and determining the first likelihood based upon at least one of a number and a frequency of the normalized words included on the list.

9. The one or more computer storage media of claim 8, wherein breaking the webpage text into one or more words comprises:
   identifying at least one bi-gram by combining consecutive words of the one or more words; and
   comparing the at least one identified bi-gram to a list of known adult bigrams,
   wherein determining the first likelihood comprises determining the first likelihood based upon at least one of a number and a frequency of the normalized words included on the list of known adult words and a number and a frequency of identified bigrams included on the list of known adult bi-grams.

10. The one or more computer storage media of claim 3, wherein analyzing the URL to determine the first likelihood that the received content is adult content comprises:
    breaking the URL into one or more words;
    normalizing the one or more words utilizing at least one of stemming and equivalence classifying;
    comparing the normalized one or more words to a list of known adult words; and
    determining the first likelihood based upon at least one of a number and a frequency of the normalized words included on the list.

11. The one or more computer storage media of claim 10, wherein breaking the URL into one or more words comprises:
    identifying at least one bi-gram by combining consecutive words of the one or more words; and
    comparing the at least one identified bi-gram to a list of known adult bigrams,
    wherein determining the first likelihood comprises determining the first likelihood based upon at least one of a number and a frequency of the normalized words included on the list of known adult words and a number and a frequency of identified bigrams included on the list of known adult bi-grams.

12. A computer system embodied on at least one computer storage media having computer-executable instructions embodied thereon for performing a method for classifying content as containing adult content, the system comprising:
    a receiving component that receives content having a uniform resource locator (URL), webpage text, and at least one image associated therewith;
    a URL classifier component that determines a first likelihood that the received content is not adult content;
    a page text classifier component that determines a second likelihood that the received content is not adult content based on determining the first likelihood that the received content is not adult content;
    an image classifier component that determines a third likelihood that the received content is not adult content based on determining the second likelihood that the received content is not adult content; and
    a multimodal component that determines if the received content is adult content or not adult content based on the first likelihood, the second likelihood, and the third likelihood.

13. The computer system of claim 12, wherein if the received content is classified as adult, a Uniform Resource Locator (URL) associated with the web page is included on a list of known adult URLs.

14. One or more computer storage media having computer-executable instructions embodied thereon for performing a method for classifying adult content, the method comprising:
    receiving content having a uniform resource locator (URL), webpage text, and at least one image associated therewith;
    analyzing the URL to determine a first likelihood that the received content is not adult content;
    upon determining the first likelihood that the received content is not adult content, analyzing the webpage text to determine a second likelihood that the received content is not adult content;
    upon determining the second likelihood that the received content is not adult content, analyzing the at least one image to determine a third likelihood that the received content is not adult content, wherein the analyzing comprises:
    (1) analyzing the at least one image to determine if the at least one image includes one or more face regions,
    (2) analyzing the at least one image to determine if the at least one image includes one or more regions of predominantly skin-colored pixels, and
    (3) analyzing the at least one image to determine if the at least one image includes one or more highly textured regions;
    upon determining the third likelihood that the received content is not adult content, analyzing the first likelihood, the second likelihood, and the third likelihood to determine a fourth likelihood that the received content is either adult content or not adult content; and
    classifying the received content as adult content or not adult content based upon the fourth likelihood.

15. The method of claim 14, further comprising:
    receiving a search request;
    determining that the received content satisfies the search request; and
    presenting the received content in response to the search request only if the received content is classified as not adult.

16. The method of claim 14,
    wherein if it is determined that the at least one image includes one or more regions of predominantly skin-colored pixels, the method further comprises analyzing a shape of the one or more regions of predominantly skin-colored pixels to determine if at least one of the one or more regions of predominantly skin-colored pixels has a human-body shape,
    and wherein determining the third likelihood comprises determining a likelihood that the at least one image is an adult image based upon whether the at least one image includes one or more face regions, one or more highly textured regions, and one or more human-body shaped regions of predominantly skin-colored pixels.

17. The method of claim 14, wherein if it is determined that the at least one image includes one or more regions of predominantly skin-colored pixels and it is determined that the at least one image includes one or more face regions, the method further comprises:
    comparing the one or more regions of predominantly skin-colored pixels and the one or more face regions to determine coincidence there between,
    wherein if it is determine that at least one of the one or more face regions is coincident with at least one of the one or regions of predominantly skin-colored pixels, the coincident region is removed with respect to determining the likelihood that the at least one image is an adult image.

18. The method of claim 14, wherein if it is determined that the at least one image includes one or more regions of predominantly skin-colored pixels and it is determined that the at least one image includes one or more highly textured regions, the method further comprises:

comparing the one or more regions of predominantly skin-colored pixels and the one or more highly textured regions to determine coincidence there between,     wherein if it is determined that at least one of the one or more highly textured regions is coincident with at least one of the one or regions of predominantly skin-colored pixels, the coincident region is removed with respect to determining the likelihood that the at least one image is an adult image.

* * * * *

UNITED STATES PATENT AND TRADEMARK OFFICE
CERTIFICATE OF CORRECTION

| | |
|---|---|
| PATENT NO. | : 8,000,504 B2 |
| APPLICATION NO. | : 11/833775 |
| DATED | : August 16, 2011 |
| INVENTOR(S) | : Xiadong Fan et al. |

It is certified that error appears in the above-identified patent and that said Letters Patent is hereby corrected as shown below:

In column 4, line 1, after "is" insert -- not made between such categories as "workstation," "server," "laptop," "hand-held device," etc., --.

In column 7, line 66, before "both" insert -- "pornography" is an adult unigram. A bi-gram is a combination of two or more words where --.

Signed and Sealed this
Eighth Day of November, 2011

David J. Kappos
*Director of the United States Patent and Trademark Office*